United States Patent [19]
Baker

[11] 4,384,819
[45] May 24, 1983

[54] PROXIMITY SENSING

[75] Inventor: Peter D. Baker, Basingstoke, England

[73] Assignee: Smiths Industries Public Limited Company, London, England

[21] Appl. No.: 213,753

[22] Filed: Dec. 5, 1980

[30] Foreign Application Priority Data

Dec. 11, 1979 [GB] United Kingdom ............... 7942606

[51] Int. Cl.³ .................... F03B 15/00; F01B 25/16
[52] U.S. Cl. ...................................... 415/14; 415/1; 415/118; 415/127
[58] Field of Search ................. 415/17, 29, 49, 14, 415/118, 127, 171, 138; 356/375, 373, 426; 250/224

[56] References Cited

U.S. PATENT DOCUMENTS

| 4,153,388 | 5/1979 | Naegeli | 415/118 X |
| 4,180,329 | 12/1979 | Hildebrand | 415/118 X |
| 4,326,804 | 4/1982 | Mossey | 415/118 X |

FOREIGN PATENT DOCUMENTS

| 52-57411 | 5/1977 | Japan . |
| 1277748 | 6/1972 | United Kingdom . |
| 1483236 | 8/1977 | United Kingdom . |
| 1545656 | 5/1979 | United Kingdom . |
| 2055269 | 2/1981 | United Kingdom . |
| 2063001 | 5/1981 | United Kingdom . |

Primary Examiner—Philip R. Coe
Assistant Examiner—Frankie L. Stinson
Attorney, Agent, or Firm—Pollock, Vande Sande & Priddy

[57] ABSTRACT

A system for use in a gas-turbine engine, for controlling the clearance between the tips of the blades and a surrounding shroud, has a probe mounted in the shroud. A microwave oscillator supplies microwave energy to the probe which propagates energy towards the blades and receives energy reflected from the blades. A mixer is mounted remote from the probe and mixes the energy reflected from the blades with a reference signal derived either from energy transmitted by the oscillator or from the energy reflected by the tip of the probe. This produces interference dependent upon the phase difference between the energy reflected by the blades and the reference signal. From this phase difference, the system derives an indication of the separation of the blades from the probe and uses this to displace the shroud along its length, thereby altering the clearance between the tips of the blades and the shroud.

12 Claims, 14 Drawing Figures

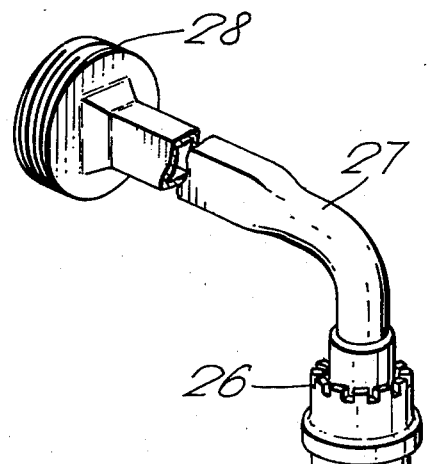
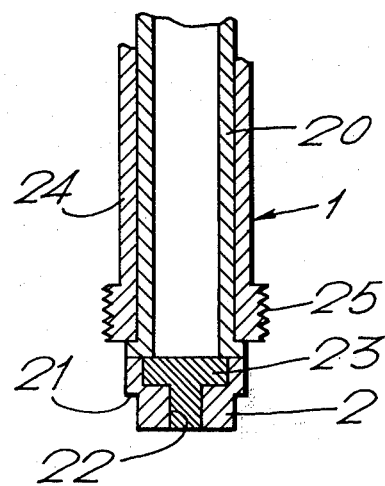

PROXIMITY SENSING

BACKGROUND OF THE INVENTION

This invention relates to methods and systems for sensing the proximity of a rotating blade in a turbine, and to methods and systems for maintaining a substantially constant clearance of a rotating blade in a turbine.

The invention is more particularly concerned with systems for sensing the clearance between the tip of a blade in a gas-turbine engine and a surrounding member, and to systems for maintaining a constant small clearance.

For maximum efficiency in a gas-turbine engine, the clearance between the tips of the turbine blades and the surrounding part of the engine housing must be maintained as small as possible without impeding free running of the engine shaft. The large changes in temperature experienced during operation of gas-turbine engines cause the various component parts of the engine to undergo significant thermal expansion. Because of this, it is difficult to construct engines in which the clearance between the blades and the housing is small and in which the tips of the blades will not contact the housing during prolonged operation.

It has been proposed to measure the clearance between the tips of the blades and the surrounding turbine ring, or shroud, with some form of sensor system and to alter the relative position of the blades with respect to the surrounding member in accordance with the measure of clearance, such as to maintain a constant small clearance.

More particularly, it has been proposed, in U.K. Pat. No. 1 545 656, to use a microwave proximity sensor to measure the turbine blade clearance. The system described in U.K. Pat. No. 1 545 656 uses a magic tee waveguide, one port of which is coupled to a microwave power source. The opposing second and third ports in the colinear arms are coupled respectively to a resonant waveguide iris and to an adjustable short-circuit device. The fourth port is coupled to a microwave detector. Propagating incident waves generated by the microwave source are divided equally between the two colinear arms, none of the incident waves passing to the fourth port. The resonant iris is designed to produce propagating reflected waves on the inner side of the iris (within the waveguide) and evanescent or non-propagating electromagnetic fields on the other side of iris, to the outside of the waveguide. The waveguide is mounted such that the iris is flush with the inner surface of that part of the engine housing surrounding the turbine blades. As the tips of the blades rotate past the iris, they perturb the evanescent electromagnetic fields and detune the iris by altering the equivalent shunt capacitance or inductance. Reflected waves from the iris now interfere with those from the short-circuited port and thereby propagate through the fourth port where they are detected. The output of the detector is dependent upon the reflection coefficient of the iris which is in turn dependent upon the separation of the iris from the tip of the turbine blades. By measuring the output of the detector it is thereby possible to obtain a measure of the turbine blade clearance.

In this microwave proximity sensing system, the short circuit at the second port is initially adjusted to achieve a balance and a nil output at the detector. If accuracy is to be achieved this balanced must not be affected during operation by factors other than passage of the turbine blades. To maintain the balance, however, the attenuation of the two colinear arms and their electrical lengths must be maintained equal and, since the attenuation and length of both arms will vary with their respective temperatures, it would be necessary with a gas-turbine engine to ensure that the short-circuited arm is maintained at the same temperature as the arm terminated by the iris. It can be seen that this will be difficult to achieve because the arm terminated by the iris will be subjected to the high temperatures and temperature variations in the region of the engine's turbine blades. Even if the waveguide could be held at the same temperature throughout, this would still result in variations in sensitivity of the system arising from variations in the overall temperature of the waveguide.

BRIEF SUMMARY OF THE INVENTION

It is an object of the present invention to provide apparatus for measuring and controlling the clearance of the tips of turbine blades that substantially alleviates the above-mentioned disadvantages.

According to one aspect of the present invention there is provided a system for providing an indication of the proximity of the blades of a turbine to a reference location, in which microwave oscillator means is arranged to supply microwave energy to probe means mounted with the turbine, wherein said probe means is arranged to direct propagating microwave energy towards the blades and to receive microwave energy reflected by the blades, wherein said system includes mixer means mounted remote from said probe, the mixer means being arranged to mix microwave energy reflected from the blades with microwave energy from a reference source such as thereby to produce interference dependent upon the phase difference between the energy reflected by the blades and the energy from the reference source, and wherein the system is arranged to derive an indication of the proximity of the blades to the reference location in accordance with said phase difference.

The reference source may be the oscillator means or may be provided by reflection from a part of the probe means.

By using propagating microwave energy and mounting the mixing means remote from the probe means, the mixing means need not be subjected to large temperature differences, thereby making the system more accurate.

According to another aspect of the present invention there is provided a system for providing an indication of the proximity of blades of a turbine to a reference location, including probe means arranged to direct propagating microwave energy towards said blades, and to receive microwave energy reflected by said blades; oscillator means arranged to supply microwave energy to said probe means; detector means responsive to microwave energy from said probe means, said detector means being mounted remote from said probe means; servo-controlled oscillator means arranged to control microwave energy supplied to said probe means; and synchronous detector means, said detector means being arranged to supply output signals to said synchronous detector means and to said servo-controlled oscillator means so as thereby to control operation of said servo-controlled oscillator means.

According to a further aspect of the present invention there is provided a method of maintaining a substantially constant clearance between the tips of blades of a turbine and a portion of said turbine surrounding said blades, by: supplying microwave energy to probe means mounted with said portion of the turbine and arranged to direct propagating microwave energy towards said blades; receiving microwave energy reflected by said blades; mixing the microwave energy reflected by said blades, at mixing means remote from said probe means, with microwave energy from a reference source so as thereby to produce interference dependent upon the phase difference between the microwave energy reflected from said blades and the microwave energy from said reference source; providng an output indicative of the proximity of the blades to said probe means in accordance with said phase difference; and effecting relative displacement between said blades and the portion of said turbine in accordance with said indication of proximity so as thereby to control the clearance between the tips of said blades and said portion.

A system and method for maintaining a substantially constant clearance between the blades of a gas-turbine engine and their surrounding shroud, in accordance with the present invention, will now be described, by way of example, with reference to the accompanying drawings.

BRIEF DESCRIPTION OF THE DRAWINGS

FIG. 2 is a perspective view of the probe used in the system of FIG. 1;

FIG. 3 is a cross-sectional elevation of one end of the probe of FIG. 2;

DETAILED DESCRIPTION

Figure 1:
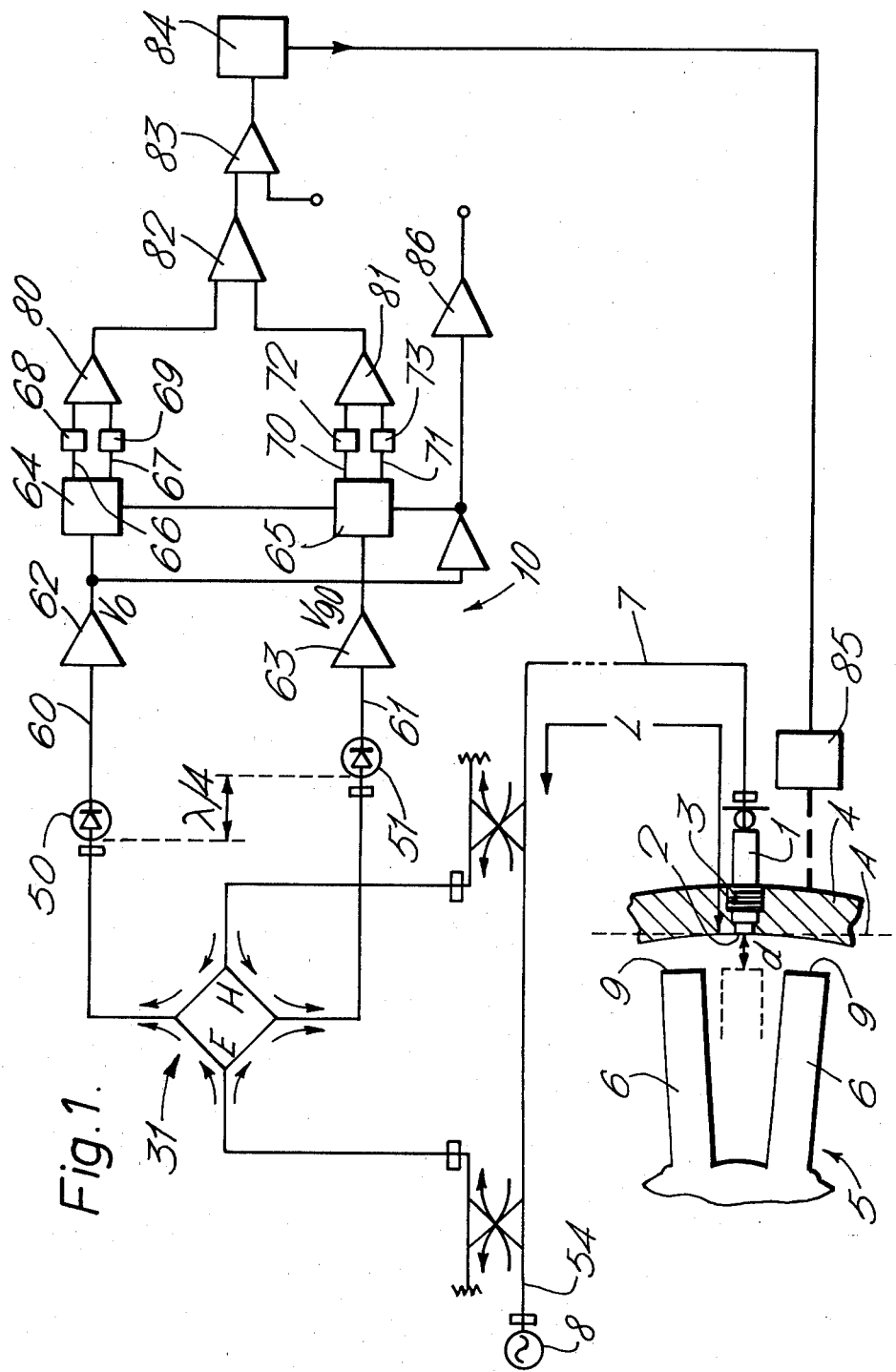
FIG. 1 shows schematically the system and part of a gas-turbine engine.

With reference to FIG. 1, there is shown a microwave probe 1 that is mounted with one end 2 projecting through an opening 3 formed in a shroud assembly 4 which extends around the gas turbine engine 5 in the region of the turbine blades 6. The probe 1 is connected by means of a length of waveguide 7 to an oscillator 8 and a detecting system indicated generally by the numeral 10. The detecting system 10 serves to provide an indication of the clearance between the tips 9 of the turbine blades 6 and the surrounding shroud assembly 4 by measuring the distance between the end 2 of the probe 1 and the turbine blades.

With reference to FIGS. 2 and 3, the probe 1 comprises a tubular body 20 of a heat-resistant alloy (such as, for example, Nimonic 75 alloy). The forward end 2 of the probe 1 has a square cross-section that is formed at its rear with an annular shoulder 21. The forward end 2 also has a central circular aperture 22 which is sealed from the atmosphere within the engine 5 by a ceramic plug 23. Surrounding the body 20 of the probe 1 is an elongate nut 24 which has a screw-threaded outer portion 25 at its forward end, and a castellated portion 26 at its rear end. The nut 24 can be rotated about the body 20 and serves to secure the probe 1 with the shroud assembly 4 by engagement of the threaded portion 25 with a cooperating screw-threaded portion in the aperture 3.

The nut 24 is rotated by means of a suitable tool (not shown) which engages the castellated portion 26 and serves to clamp the shoulder 21 firmly in position with the face of the end 2 lying in a reference plan A (FIG. 1) fixed relative to the inner surface of the shroud assembly 4. The end 2 may, for example, be flush with the inner surface of the shroud assembly or slightly below its surface so as to afford some protection to the probe 1.

A short waveguide 27 extends from the rear of the body 20 to a flange 28 which makes connection with the main waveguide 7. The short-waveguide 27 is of rectangular cross-section close to the flange 28, changing to circular cross-section close to the probe body 20 where it is bent at right angles to its length.

Figure 4:
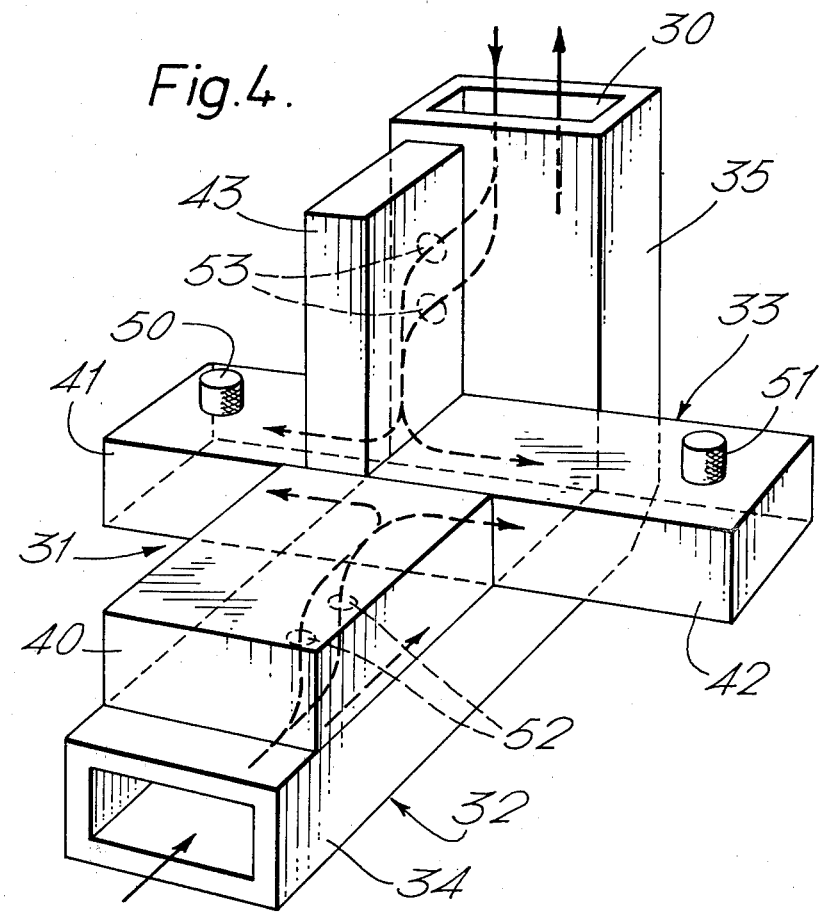
FIG. 4 is a perspective view of the mixer used in the system of FIG. 1.

The main waveguide 7 is of aluminum, having a rectangular cross-section and being typically about fourteen feet (four hundred and twenty seven centimeters) long with several joints along its length. The waveguide 7 is coated on its outer surface with a layer of silicone rubber so as to protect it from damage, and to damp vibration. The main waveguide 7 is joined at its rear end to one port 30 of a quadrature balanced mixer 31, shown in detail in FIG. 4.

The mixer 31 comprises a right-angled waveguide 32 on which is mounted a magic tee 33. The rear arm 34 of the right angled waveguide 32 opens at its rear end to receive signals from the oscillator 8, the forward arm 35 making connection at its port 30 with the waveguide 7.

The magic tee 33 comprises four arms 40 to 43 of rectangular cross-section, two of which 41 and 42 are arranged colinearly with one another. The colinear arms 41 and 42 have gallium arsenide Schottky diode detectors 50 and 51 respectively mounted close to their closed ends so as to respond to the microwave intensity in the respective arms. A coupling arm 40 extends at right angles from the colinear arms 41 and 42 midway along their length. The coupling arm 40 has two small circular apertures 52 in one face which open into the rear arm 34 of the right-angle waveguide 32 and through which microwave energy from the oscillator 8 is transmitted to the magic tee 33. The fourth arm 43 of the magic tee 33 serves to couple the magic tee with the forward arm 35 of the right-angle waveguide 32 and, in this respect, the fourth arm 43 has two small circular apertures 53 which enable microwave energy from the probe 1 to enter the magic tee. The fourth arm 43 projects at right angles from the colinear arms 41 and 42 and is also at right angles to the other coupling arm 40. The fourth arm 43 is offset along the length of the arms 41 and 42 towards the detector 50 such that the distance from the fourth arm to the detector 51 is one quarter of a wavelength (90 degrees) longer than the distance from the other detector 50.

The oscillator 8 is preferably a silicon Impatt diode oscillator arranged to oscillate at 35 GHz and is connected to the rear arm 34 of the mixer 31 by a short length of waveguide 54.

The in-phase and quadrature signals from the detectors 50 and 51 are supplied via cables 60 and 61 to respective linear amplifiers 62 and 63 which are coupled to respective squaring circuits 64 and 65. The squaring circuit 64 supplies signals on lines 66 and 67 to respective hold circuits 68 and 69, the signals on lines 66 and 67 both being in synchronism with the rotation of the turbine blades. The other squaring circuit 65 similarly supplies quadrature signals on lines 70 and 71 to respective hold circuits 72 and 73.

The hold circuits 68 and 72 are supplied with signals representative of the output of the detectors 50 and 51 respectively arising from reflection from the tips 9 of the turbine blade 6. The other hold circuits 69 and 73 are supplied with signals representative of the detector outputs when the end 2 of the probe 1 is not aligned with the tip 9 of a turbine blade 6, that is, when there is no reflection from the turbine blades.

The detecting system 10 also includes two differential amplifiers 80 and 81 which receive the outputs from the hold circuits 68 and 69, and from the hold circuits 72 and 73 respectively. The differential amplifiers 80 and 81 produce output signals corresponding to the difference between their inputs, that is, signals corresponding to that part of the outputs of the detectors 50 and 51 arising solely from reflection from the tips 9 of the turbine blades 6. The outputs from the differential amplifiers 80 and 81 are supplied to a divider 82 which provides an output in accordance with the ratio of its inputs, corresponding to the tangent of the phase angle $\phi$ between the outputs of the two detectors 50 and 51. The output of the divider 82 is supplied via a suitable buffer amplifier 83, to an actuator control unit 84. The actuator control unit 84 in turn supplies signals to an actuator 85 which controls the clearance between the tips 9 of the turbine blades 6 and the turbine shroud 4. In this respect, the shroud 4 may have a tapering, frustoconical inner surface, the actuator 85 being arranged to displace the shroud along its length so as thereby to alter the clearance between the blades 6 and the inner surface of the shroud.

The in-phase amplifier 62 also supplies a signal in synchronism with passage of the turbine blades 6 in front of the probe 1 to a buffer amplifier 86 for use in providing an indication of turbine speed.

In operation, microwave energy is transmitted from the oscillator 8 via the right-angled waveguide 32 and the main waveguide 7 to the probe 1. Microwave energy is propagated from the tip 2 of the probe 1 and a proportion of the energy is reflected back to the probe from the tips 9 of the passing turbine blades 6. The reflected energy passes back along the main waveguide 7 to the mixer 31 where a part of its passes through the aperture 53 into the arm 43 of the magic tee 33. The reflected signal passes into the colinear arms 41 and 42 where it mixes and interferes with the signal direct from the oscillator 8 emerging from the coupling arm 40. If the distance between the mixer 31 and the end 2 of the probe 1 is L and the clearance between the turbine tip 9 and the end 2 of the probe is d then the total distance travelled by a reflected signal from the mixer will be 2(L+d).

The signal reflected back to the mixer 31 is made up of energy reflected from the end 2 of the probe 1 and energy reflected from the tips 9 of the turbine blades 6. The reflection coefficient of the end 2 of the probe 1 is constant and independent of the blade clearance; the energy reflected from the tip of the turbine blades 6 is intermittent according to rotation of the turbine blades and varies in phase according to the distance d of the probe from the blades.

Figure 5A:
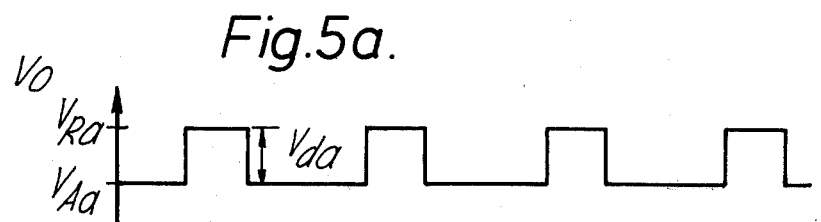
FIGS. 5a and 5b represent the outputs of two components of the system of FIG. 1.
Figure 5B:
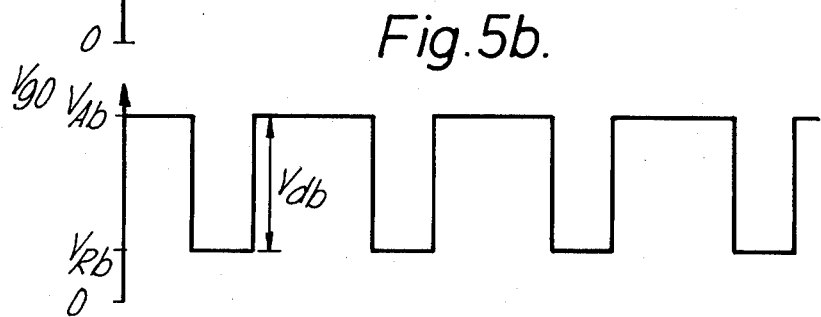

The resultant outputs $V_0$ and $V_{90}$ from the amplifiers 62 and 63 respectively are shown in FIGS. 5a and 5b. The height of the pulses $V_{da}$ and $V_{db}$ respectively are dependent upon the clearance d of the turbine blades 6.

Figure 6:
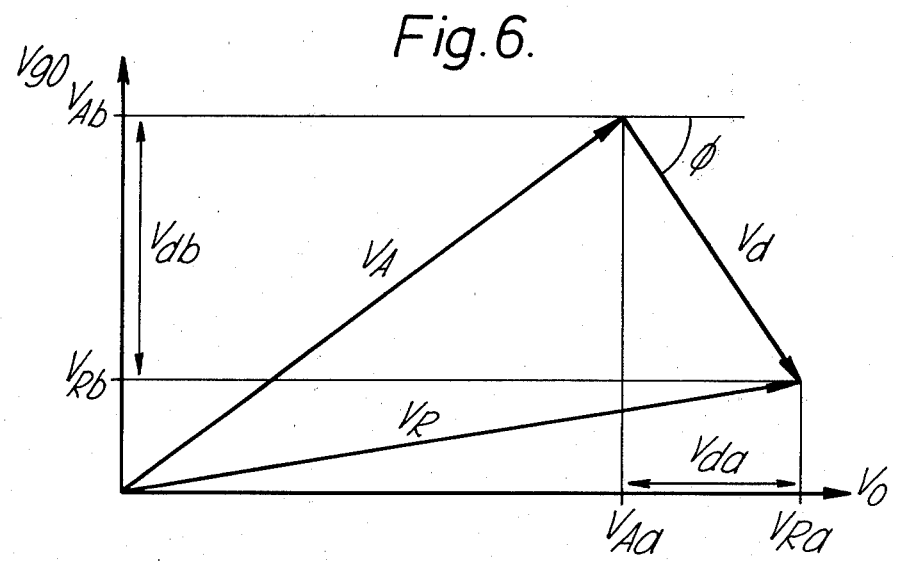
FIG. 6 is a vector diagram of the outputs shown in FIGS. 5a and 5b.

FIG. 6 is a vector diagram in which $V_R$ represents the total reflected signal strength, $V_A$ is the signal arising from reflection from the end 2 of the probe 1 and $V_d$ is the intermittent signal strength arising solely from reflection from the tips 9 of the blades 6. The component of the total reflected signal strength $V_R$ along the axis $V_0$ is $V_{Ra}$, and along the axis $V_{90}$ is $V_{Rb}$. The component of the signal strength $V_A$ arising from reflection from the end 2 of the probe 1, along the axis $V_0$ is $V_{Aa}$, and along the axis $V_{90}$ is $V_{Ab}$. The component of the signal strength $V_d$ arising solely from reflection from the tips 9 of the blades 6, along the axis $V_0$ is $V_{da}$, and along the axis $V_{90}$ is $V_{db}$. It can be seen therefore that:

$$V_{da} = V_{Ra} - V_{Aa} \qquad (I)$$

and $$V_{db} = V_{Ab} - V_{Rb} \qquad (II)$$

In the circuit shown in FIG. 1, the differential amplifiers 80 and 81 are arranged to produce the outputs $V_{da}$ and $V_{db}$ respectively by determining the difference between the total reflected signals $V_{Ra}$ and $V_{Rb}$ (from the hold circuits 68 and 72 respectively), and the constant signals $V_{Aa}$ and $V_{Ab}$ (from the hold circuits 69 and 73 respectively), in accordance with the expressions (I) and (II).

It can be seen from FIG. 6 that the phase angle $\phi$ is given by the expression:

$$\tan \phi = V_{db}/V_{da} \qquad (III)$$

and that the output of the divider 82 is therefore dependent upon the tangent of the phase angle $\phi$.

Since the output of $\tan \phi$ is in the form of a ratio it is independent of variations in the power level of the oscillator 8. The system is also substantially unaffected by the high temperatures of the engine since the mixer 31 is mounted remotedly at a cool location.

The divider 82 could be arranged to provide a signal shaping function such as to produce a more linear output with respect to the clearance d.

Figure 7:
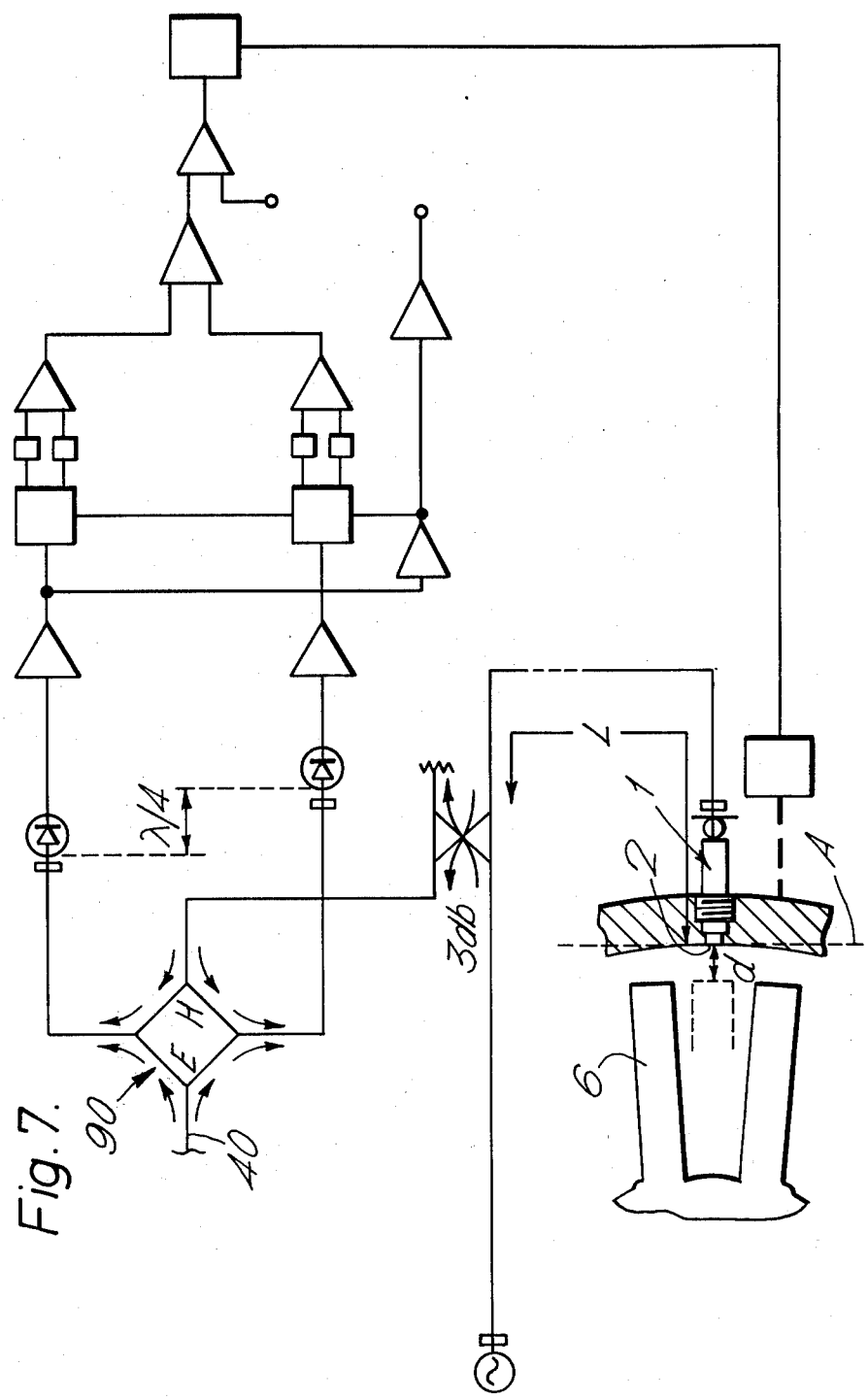
FIGS. 7 to 13 shows schematically various modifications of the system of FIG. 1.

An alternative arrangement is shown in FIG. 7 which is similar to that of FIG. 1 but, instead of the mixing the microwave energy reflected by the turbine blades 6 with microwave energy derived directly from the oscillator 8, it is mixed with the microwave energy reflected by the end 2 of the probe 1. In this respect, the system shown in FIG. 7 has a different form of mixer 90, similar to the mixer 31 of FIG. 4 but in which the coupling arm 40 is short-circuited and does not communicate with the rear arm 34 of the right-angle waveguide 32.

Figure 8:
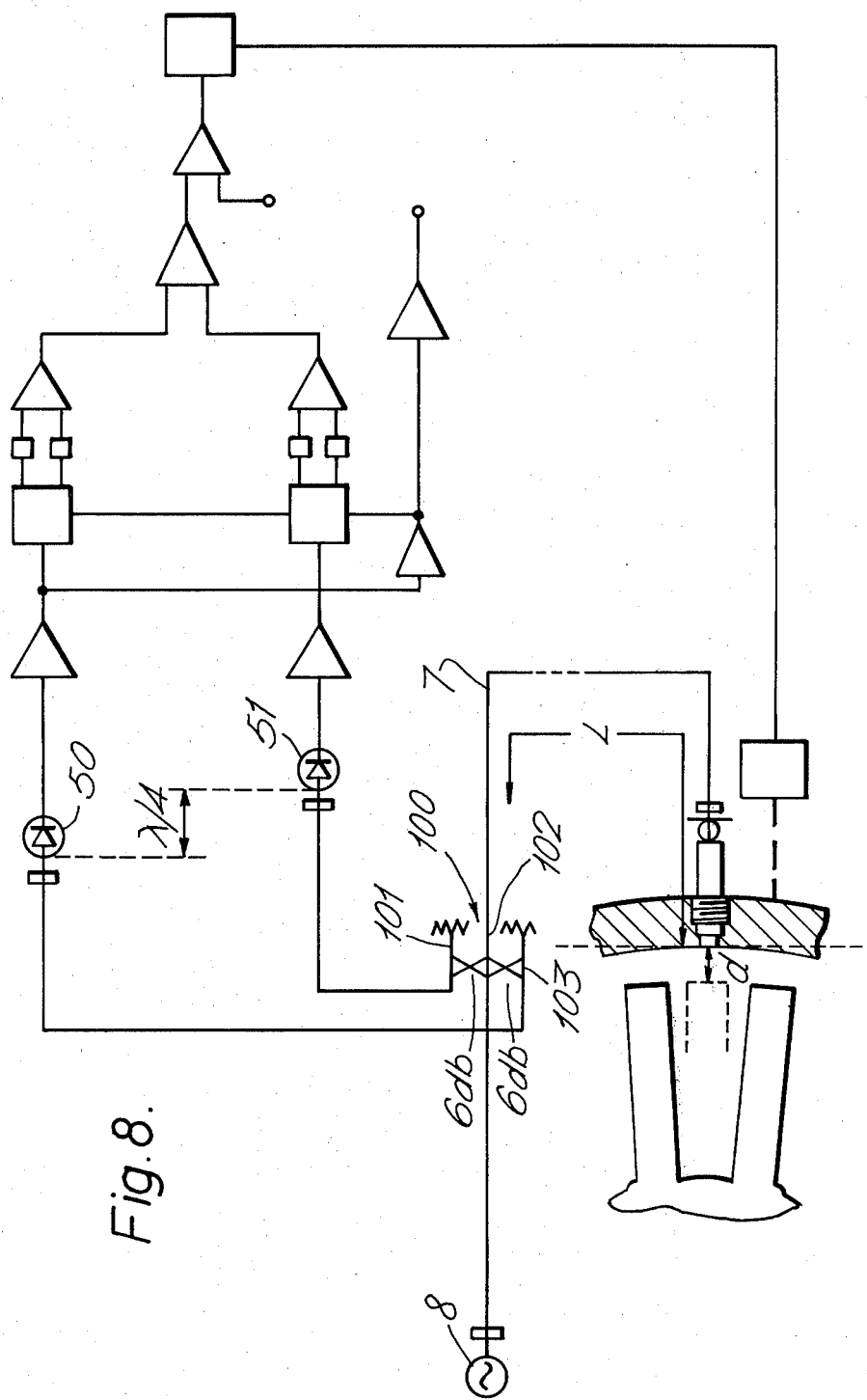
Figure 9:
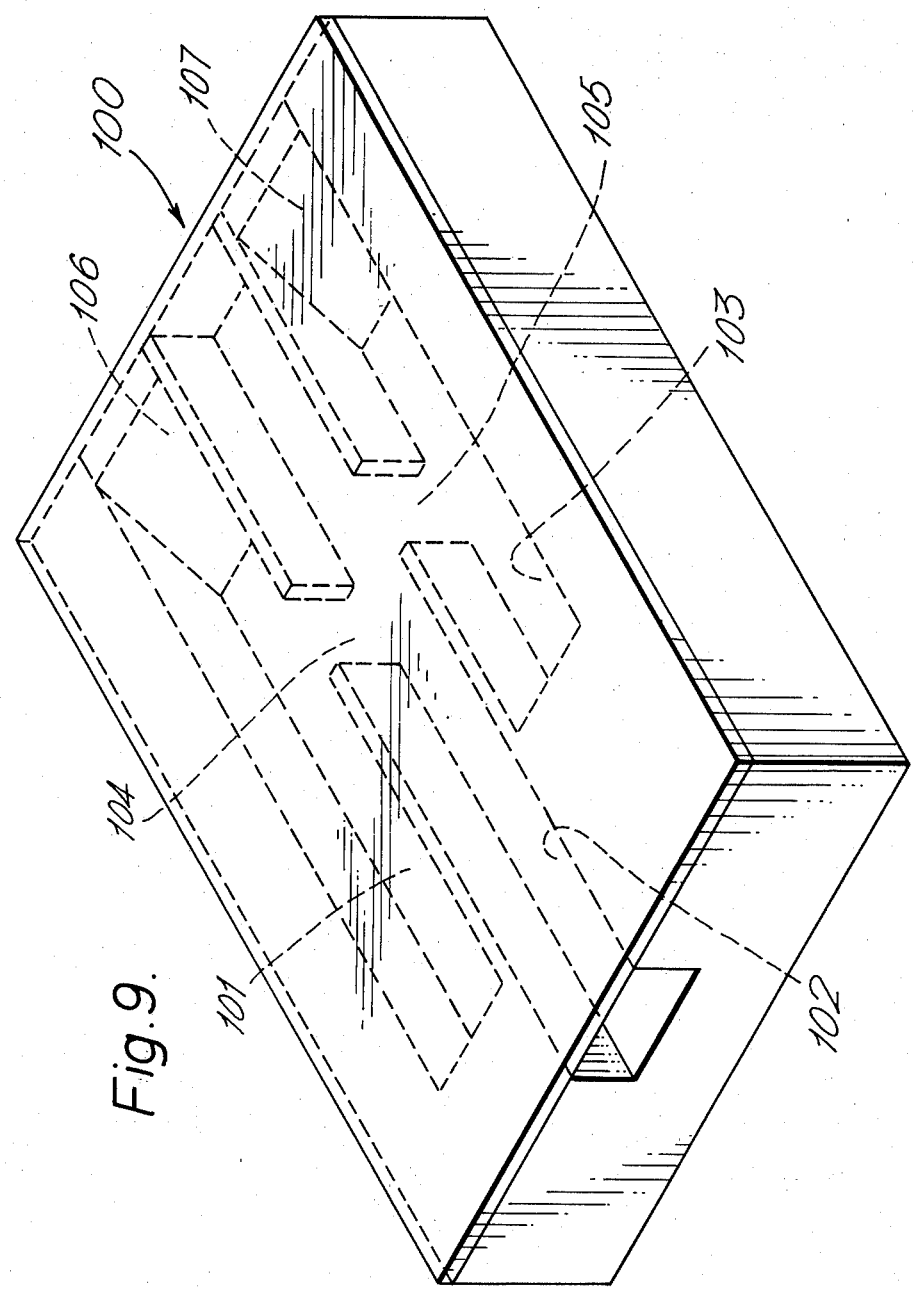

Another alternative arrangement, which is shown in FIGS. 8 and 9, also operates by mixing the microwave energy reflected from the blades 6 with that reflected from the end 2 of the probe 1. This arrangement, however, has a mixer 100 (FIG. 9) comprising three parallel slots forming waveguides 101, 102 and 103. The central waveguide 102 makes connection at one end with the oscillator 8 and at the other end with the main waveguide 7. The other two parallel waveguides 101 and 103 are each coupled to the central waveguide 102 by 6db coupling apertures 104 and 105 respectively which give an inherent ninety degree phase difference from the central waveguide. Both waveguides 101 and 103 are closed at their ends, being terminated at one end by respective loads 106 and 107. The waveguides 101 and 103 have detectors 50 and 51 respectively responsive to the microwave energy in the waveguides.

Figure 10:
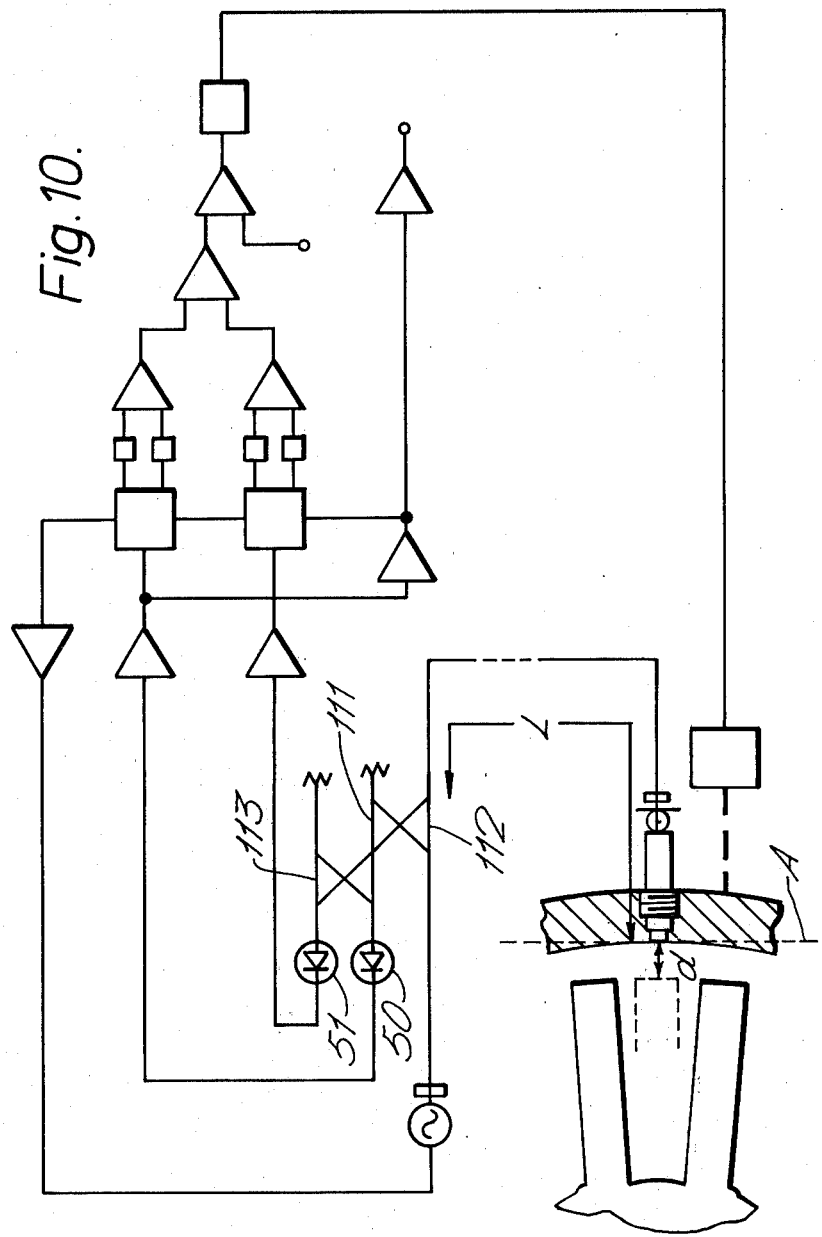
Figure 11:
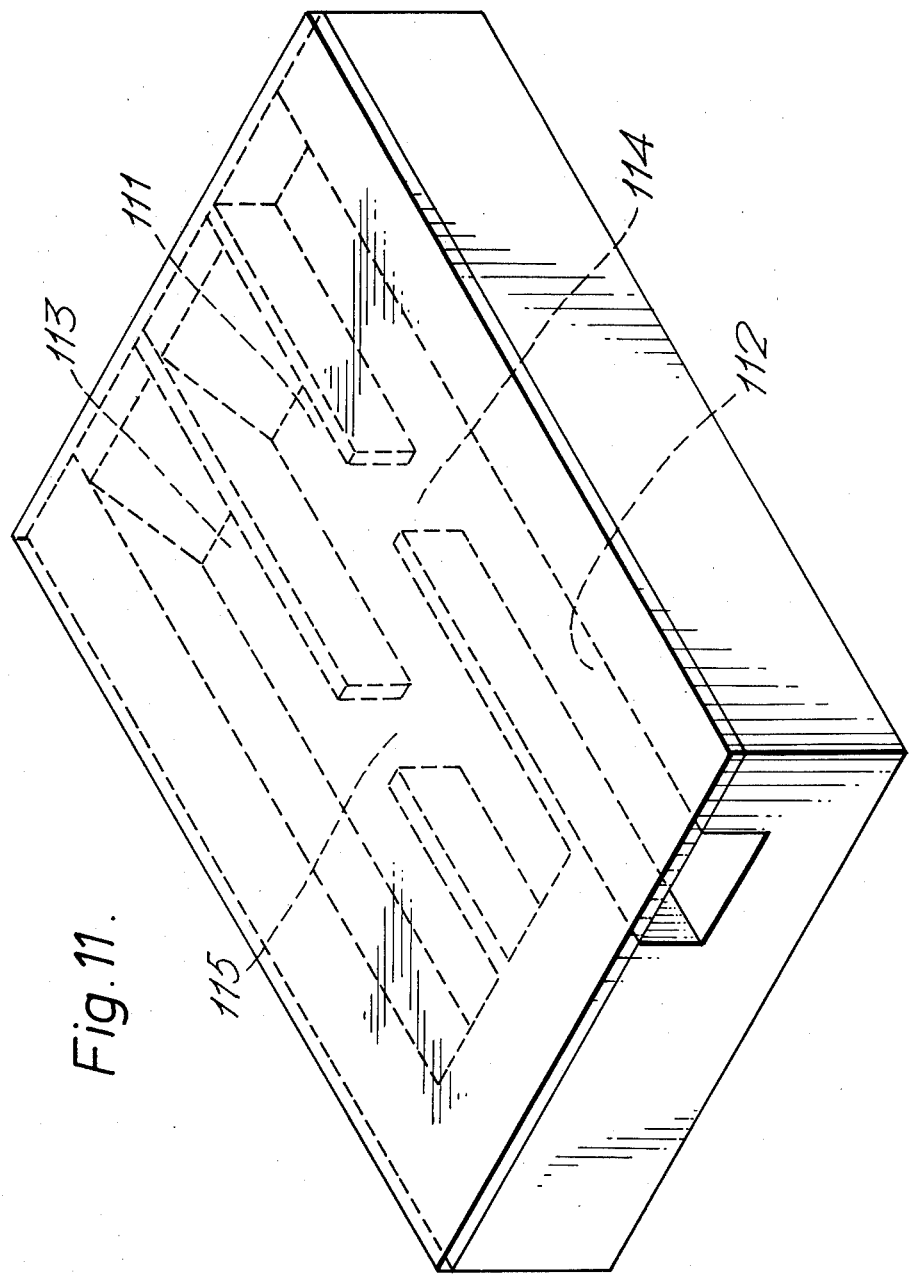

In a further alternative arrangement, shown in FIGS. 10 and 11, two waveguides 111 and 113 are coupled with one another in series with a waveguide 112 through which energy is transmitted to the probe 1. In this arrangement there is one 3db coupling aperture 114 between the waveguides 112 and 111 and another 3db coupling aperture 115 between the waveguides 111 and 113. Detectors 50 and 51 mounted in the waveguides 111 and 113 would, in this way, have an inherent ninety degree phase difference between them.

Figure 12:
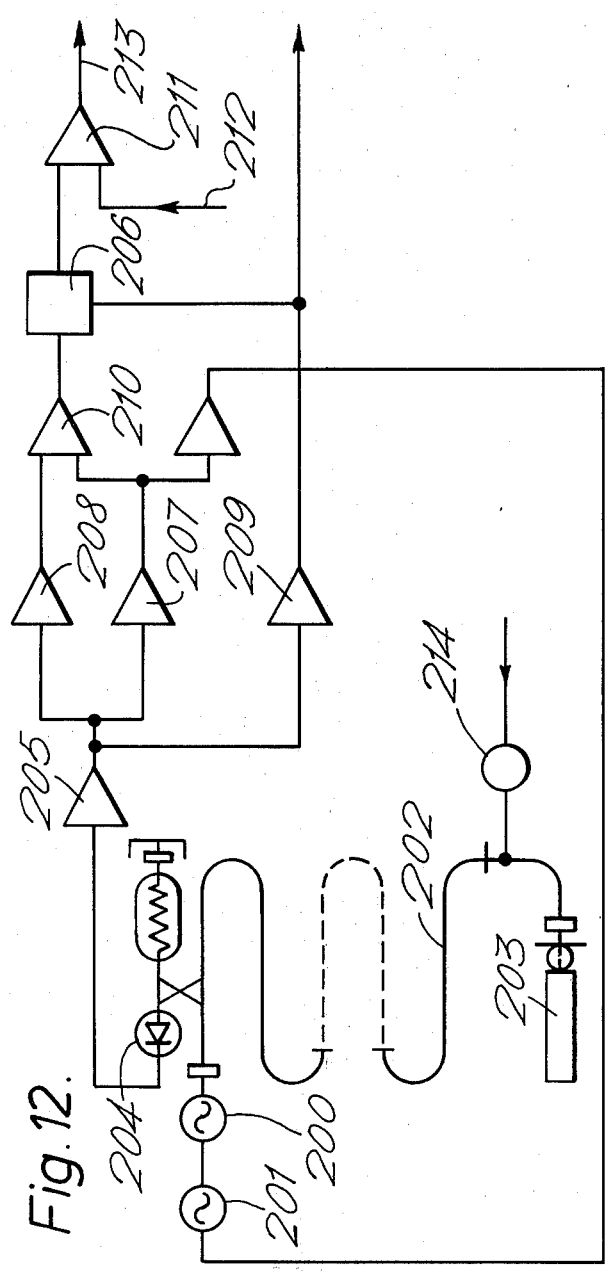

Yet another arrangement is shown in FIG. 12 in which a millimetric oscillator 200 is frequency modulated by a servo-controlled oscillator 201 to a controlled frequency deviation. This deviation is a function of the length of the waveguide feed 202 to the probe 203 and results in the maximum modulation depth at a particular harmonic. Phase modulation of the FM sidebands, resulting from the clearance between the tips of the rotating turbine blades and the tip of the probe 203 is detected and the phase is computed. Demodulation is carried out at the intermediate frequency. The overall system has as a result, a higher overall reliability and accuracy.

A single crystal detector 204 is used which supplies its output to a broad band amplifier 205. The amplifier 205 supplies signals to a synchronous detector 206, to two narrow band amplifiers 207 and 208, operating at the 2nd and 3rd harmonics of the modulation frequency, and to a further amplifier 209 which provides the speed term. The outputs of the narrow band amplifiers 207 and 208 are the detected amplitudes of the sidebands associated with their respective suppressed carriers. The ratio of these two signals is obtained in a divider 210 and synchronously detected by the detector 206 at the turbine blade passing frequency. The output of the detector 206 is compared in unit 211 with a reference signal on line 212 to produce an error signal on line 213.

The output of the 2nd harmonic amplifier 207 is used in a simple servo system, supplying signals to the servo controlled oscillator 201 such as to maintain the modulation index fixed in spite of variations in the modulation sensitivity of the oscillator 200 caused by temperature changes.

This arrangement also includes a modulator for checking operation of the system by producing microwave reflection at a known distance from the reference. The modulator is represented diagrammatically by the unit 214 and consists of a post positioned over a hole in the broad face of the waveguide 202 through which it is moved by a solenoid. In operation, microwave energy is reflected by the post when it is moved into the waveguide 202 and the phase shift produced can be compared with that which should be produced by reflection from the known position.

Figure 13:
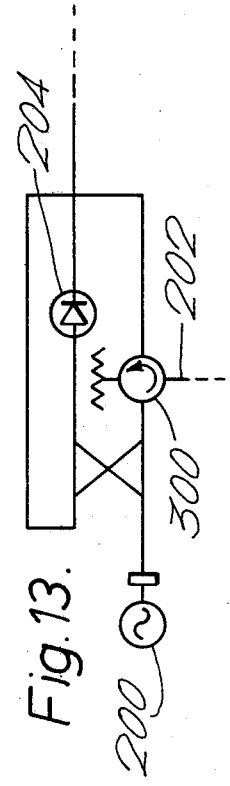

Alternatively to the arrangement of FIG. 12, a more efficient circuit could be provided, in the manner shown in FIG. 13, by use of a passive device known as a circulator 300. Such an arrangement results in a reduction in coupling losses from 6db to 1db. A lower power source could thereby be used resulting in a reduction in nominal power rating.

I claim:

1. A turbine blade proximity indicating system for providing an indication of the proximity of blades of a turbine to a reference location, the system being of the kind including probe means, means mounting said probe means with the turbine, and a microwave oscillator that supplies microwave energy to said probe means, the improvement wherein said probe means is positioned and operative to direct propagating microwave energy towards the blades of the turbine and to receive microwave energy reflected by said blades, said system including means mounted remote from said probe means for mixing microwave energy reflected from said blades with microwave energy reflected from a part of said probe means, the said mixing means being operative to produce interference dependent upon the phase difference between the energy reflected by said blades and the energy from said probe means, and said system including means responsive to said phase difference for deriving an indication of the proximity of the blades to the reference location.

2. A system according to claim 1, wherein said mixing means includes a magic tee assembly.

3. A system according to claim 1, wherein said system includes a circuit that compares a first output, derived when said blades are positioned such that said probe means receives energy reflected from the blades, with a second output, derived when the said blades are positioned such that the probe means receives substantially no energy reflected from the blades.

4. A system according to claim 1, wherein said system includes two detectors, and means mounting said detectors in spaced relation to one another so as to provide signals that are in quadrature with one another, said system including a divider circuit, and means supplying signals derived from said two detectors to said divider circuit.

5. A system for providing an indication of the proximity of blades of a turbine to a reference location comprising: probe means; means mounting said probe means with said turbine to direct propagating microwave energy towards said blades, and to receive microwave energy reflected by said blades; oscillator means supplying microwave energy to said probe means; detector means responsive to microwave energy from said probe means; means mounting said detector means remote from said probe means; servo-controlled oscillator means controlling microwave energy supplied to said probe means; synchronous detector means; and means for supplying output signals from said detector means to said synchronous detector means and to said servo-controlled oscillator means to control operation of said servo-controlled oscillator means.

6. A system according to claim 1, including a microwave reflector post, and solenoid means moveably mounting said microwave reflector post intermediate the end of said probe means and said microwave oscillator, said solenoid means being actuable to move said microwave reflector post to a position in which said microwave reflector post reflects microwave energy to said mixing means for comparison with microwave energy from said probe means.

7. A system according to claim 1, including an assembly surrounding said turbine blades, actuator means, and means supplying signals in accordance with said indication of proximity to said actuator means to cause said actuator means to control the proximity of said turbine blades to said surrounding assembly.

8. A system according to claim 7, wherein the internal diameter of said surrounding assembly varies along its length, said system including means mounting said surrounding assembly for displacement along its length, and means coupling said actuator means to said surrounding assembly such that said actuator means controls said proximity by displacing the assembly along its length.

9. A method of providing an indication of the proximity of blades of a turbine to a reference location comprising the steps of: supplying microwave energy to probe means mounted with said turbine; directing propagating microwave energy from said probe means towards said blades; receiving microwave energy reflected by said blades; mixing said microwave energy reflected by said blades, at mixing means remote from said probe means, with microwave energy reflected from a part of said probe means thereby producing interference dependent upon the phase difference between said microwave energy reflected from said blades and said microwave energy from said probe means; and providing an output indicative of the proximity of said blades to said probe means in accordance with said phase difference.

10. A method of maintaining a substantially constant clearance between tips of blades of a turbine and a portion of said turbine surrounding said blades, comprising the steps of: supplying microwave energy to probe means mounted with said portion of said turbine; directing propagating microwave energy towards said blades; receiving microwave energy reflected by said blades; mixing said microwave energy reflected by said blades, at mixing means remote from said probe means, with microwave energy reflected from a part of said probe means thereby producing interference dependent upon the phase difference between said microwave energy reflected from said blades and said microwave energy from said probe means; providing an output indicative of the proximity of said blades to said probe means in accordance with said phase difference; and effecting relative displacement between said blades and said surrounding portion of said turbine in accordance with said indication of proximity so as to control the clearance between the tips of said blades and said surrounding portion of said turbine.

11. A gas-turbine engine system comprising: a turbine including turbine blades, an outer assembly, and means mounting said outer assembly in close proximity with the outer tips of said blades; and means for controlling the clearance between said blades and said outer assembly comprising: probe means, means mounting said probe means with said outer assembly to direct propagating microwave energy towards said blades and to receive microwave energy reflected by said blades, oscillator means supplying microwave energy to said probe means, means mounted remote from said probe means that mixes microwave energy reflected from said blades with microwave energy reflected from a part of said probe means, the mixing means being operative to produce interference dependent on the phase difference between the energy reflected by said blades and the energy from said probe means, means responsive to said phase difference for deriving an indication of the proximity of the blades to the probe means, and actuator means for displacing said outer assembly relative to said blades in accordance with said indication of proximity.

12. A system according to claim 1, wherein the said part of the probe means is the tip of the probe means.

* * * * *